Figure 1:
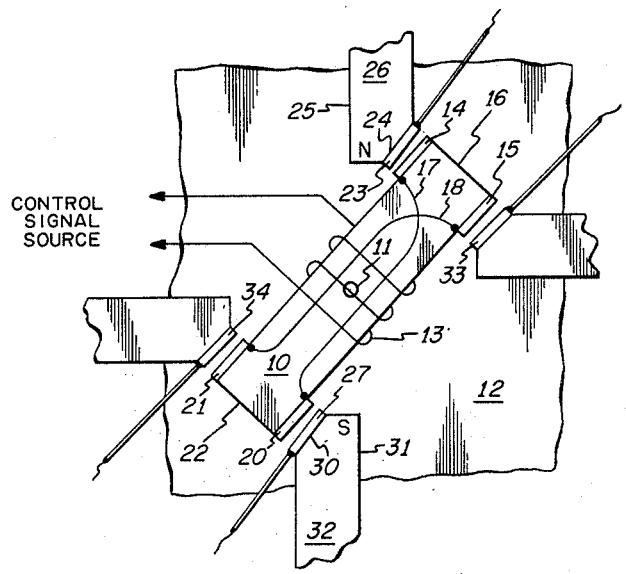

Dec. 15, 1964  G. H. THORNE ETAL  3,161,744
ELECTROMAGNETIC CIRCUIT CONTROLLING DEVICES
Filed Oct. 29, 1962  3 Sheets-Sheet 1

INVENTORS
GALE H. THORNE
GARY J. VINCENT
BY
ATTORNEY

Dec. 15, 1964   G. H. THORNE ETAL   3,161,744
ELECTROMAGNETIC CIRCUIT CONTROLLING DEVICES
Filed Oct. 29, 1962   3 Sheets-Sheet 2

INVENTORS
GALE H. THORNE
GARY J. VINCENT
BY
ATTORNEY

Dec. 15, 1964    G. H. THORNE ETAL    3,161,744
ELECTROMAGNETIC CIRCUIT CONTROLLING DEVICES
Filed Oct. 29, 1962    3 Sheets-Sheet 3

INVENTORS
GALE H. THORNE
GARY J. VINCENT
BY
ATTORNEY

United States Patent Office 3,161,744
Patented Dec. 15, 1964

3,161,744
ELECTROMAGNETIC CIRCUIT CONTROLLING
DEVICES
Gale H. Thorne, Salt Lake City, Utah, and Gary J. Vincent, Bloomfield, Colo., assignors to Sperry Rand Corporation, Great Neck, N.Y., a corporation of Delaware
Filed Oct. 29, 1962, Ser. No. 233,588
5 Claims. (Cl. 200—93)

This invention relates to circuit controlling devices and particularly to high speed relay apparatus suitable for multiple switching applications.

Conventional pull-in type relays have a number of disadvantages particularly when utilized for high speed operation. The speed of conventional relays which utilize a spring for the restoring force is dependent upon the force exerted by the energizing coil minus the force exerted by the restoring spring. With the present invention the force of attraction and repulsion is produced by poles of permanent magnets with respect to a magnetizable armature thereby resulting in a substantial increase in the effective acceleration. By minimizing the mass of the armature, very high switching speeds are attained. The tendency of the movable relay contact to bounce as in prior art spring loaded relays because of the spring restraining force is eliminated in the present invention since there are no restraining springs. This also permits the pull-in and drop-out operations to be identical.

Prior art relays usually require an expenditure of power to maintain the relay latched against the spring force of the restoring spring. The present invention is self-latching and therefore eliminates the necessity to maintain the relay energized. Further, known switches are relatively complex and cumbersome whereas the relay of the present invention is extremely reliable and compact and many of them can be readily packaged in a small volume to provide a high packaging density.

One of the more important characteristics of the present invention is that it is capable of using two sources of information to select a unique operation from a matrix of possible operations with a minimum of controlling signal equipment and relay complexity.

It is therefore a primary object of the present invention to provide a circuit controlling device that is reliable at high speed operation and is extremely simple and compact.

It is a further object of the present invention to provide a circuit controlling device having positive operation with identical bilateral switching characteristics which requires no holding power It is another object of the present invention to provide a circuit controlling device providing the capability of using two sources of information to select a unique operation which is small, economical to manufacture and positive in operation.

The above objects are accomplished by means of a magnetizable armature having end portions between and cooperative with pole pieces of permanent magnets. Electrical contacts are attached to the ends of the armature and the cooperative adjacent surfaces of the permanent magnet pole pieces. The armature is positionably mounted between the pole pieces and has a control winding which magnetically orients the armature in accordance with the polarity of the signal through the winding. With the current flowing in one direction through the winding, the armature is magnetically oriented in order that it is attracted to one set of permanent magnet pole pieces and repelled by the other set thereby making contact between predetermined pairs of contacts. When the current flows through the winding in the opposite direction, the armature is positioned in the opposite direction.

Figure 2:
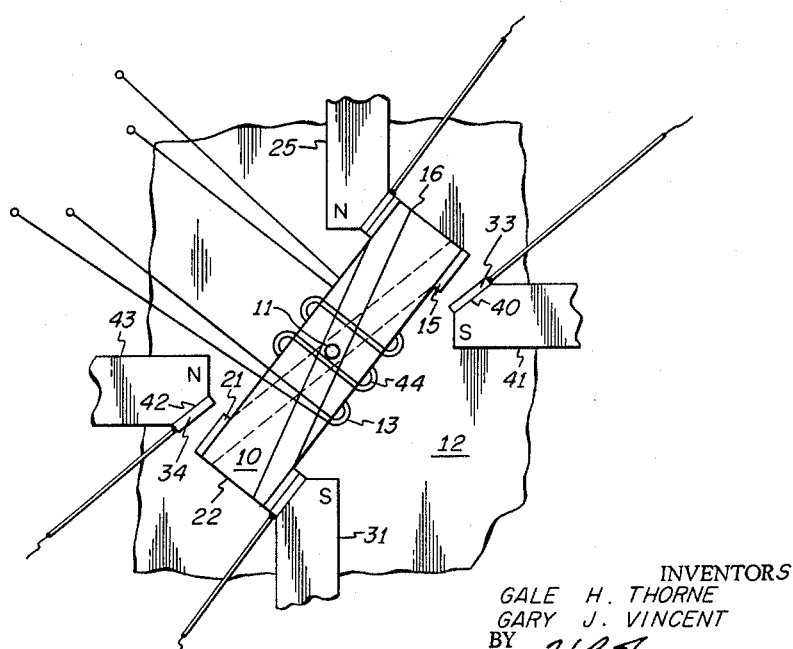
Figure 3:
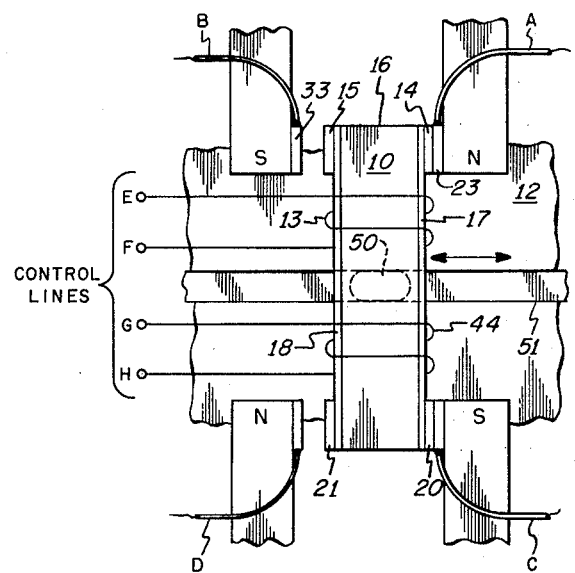
Figure 4:
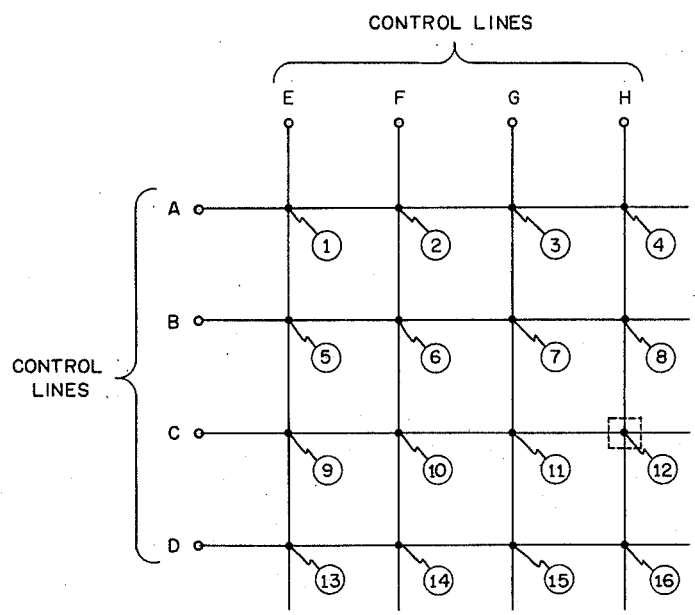
Figure 5:
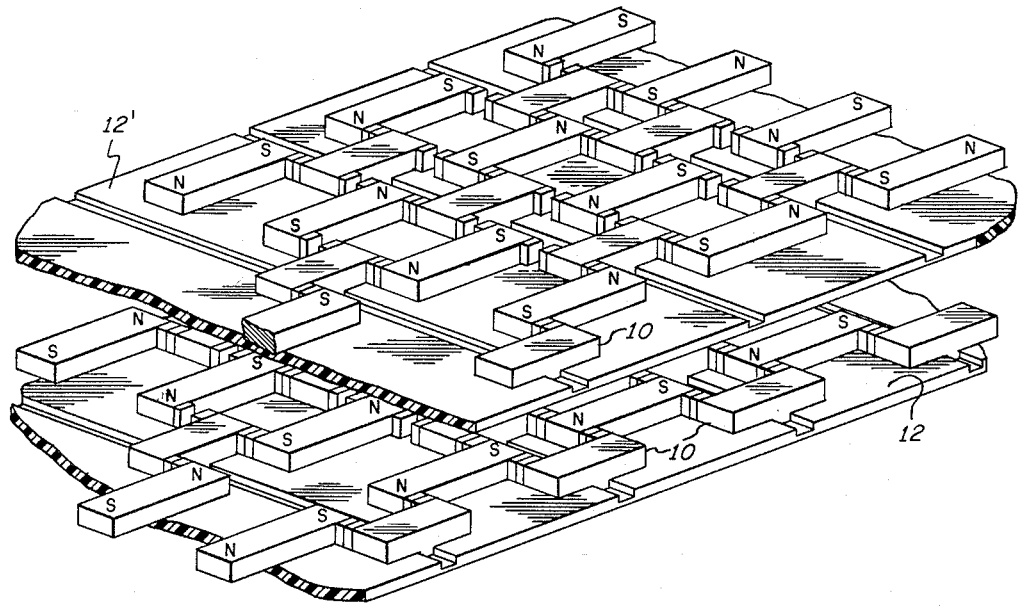
Figure 6:
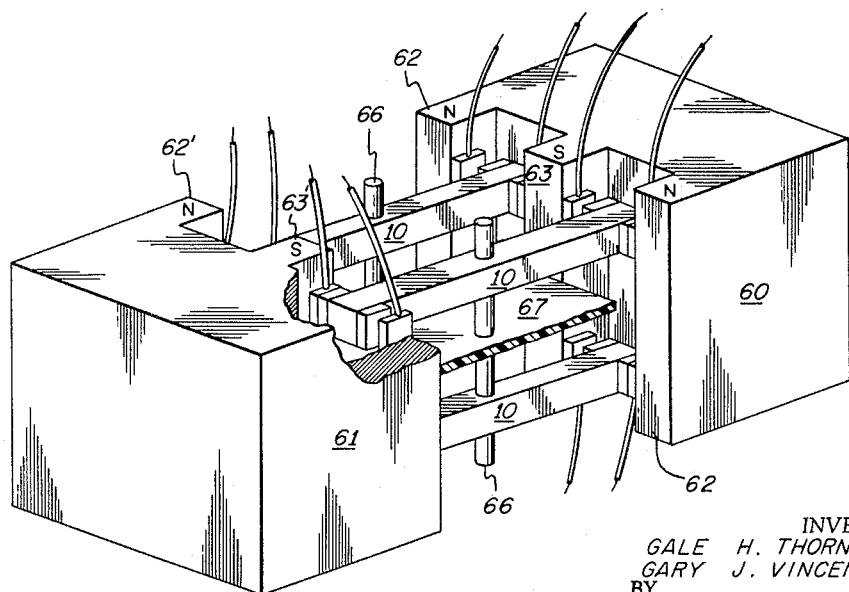

Referring to the drawings:
FIG. 1 is a plan view of a circuit controlling device constructed in accordance with the present invention;
FIG. 2 is a perspective view of an alternative embodiment of a circuit controlling device constructed in accordance with the present invention;
FIG. 3 is a further alternative embodiment of the present invention;
FIG. 4 is a typical electrical wiring schematic showing coincidence selection;
FIG. 5 shows a plurality of relays of the type shown in FIG. 3 disposed in layers; and
FIG. 6 is a perspective view of an alternative embodiment of the present invention showing a plurality of relays.

Referring to FIG. 1, a magnetizable bar-shaped armature 10 is pivotally mounted for rotation about its center around an axis perpendicular to the plane of the paper by means of a pivot 11 secured to a base 12. A control winding 13 is wound about the center of the armature 10 to magnetically orient the armature 10 in accordance with the direction of current flow through the winding 13. The armature 10 may be of soft iron or preferably it comprises a material having a square hysteresis loop such as a ferrite in order that the armature 10 can be positioned in a manner to be explained by a pulse of current.

Electrical contacts 14 and 15 are mounted on opposite sides of the upper extremity 16 of the armature 10. In a similar manner, contacts 20 and 21 are mounted on the opposite side of the lower extremity 22 of the armature 10. If the armature 10 is nonconductive, the contact 14 may be connected to the contact 20 by means of a conductive strip 17 and in a similar manner the contact 15 may be connected by a conductive strip 18 to the contact 21. The contact 14 is cooperative with a contact 23 mounted on the chamfered surface 24 of a north pole piece 25 of a permanent magnet 26. Similarly, the contact 20 is cooperative with a contact 27 mounted on the chamfered surface 30 of a south pole piece 31 of a permanent magnet 32. The pole pieces 25 and 31 may form a single permanent magnet or preferably for miniaturization purposes, they may constitute separate small bar magnets. The pole pieces 25 and 31 are secured to the base 12.

The contact 15 is cooperative with a stationary contact 33 which is mounted upon the base 12 and, in a similar manner, the contact 21 is cooperative with a stationary contact 34. The distance between the respective cooperative contacts defines the arcuate extent of the rotation of the armature 10. Preferably this distance is maintained at a minimum consistent with good switching characteristics in order to obtain high speed operation from the relay.

In operation, when current passes through the control winding 13 in a direction to make the extremity 16 a north pole and the extremity 22 a south pole, the adjacent north poles 16 and 25 and the adjacent south poles 22 and 31 will repel each other thereby causing the armature 10 to pivot in a clockwise direction. This causes the contact 15 to abut the contact 33 and the contact 21 to abut the contact 34 resulting in a continuous conductive path from the contact 34 through the contact 21, the conductive strip 18, the contact 15 and the stationary contact 33.

When the current passes through the control winding 13 in the direction to make the extremity 22 a north pole, the north pole at the extremity 22 and the adjacent south pole 31 tend to attract and in a similar manner the south pole at the extremity 16 and the north pole 25 tend to attract causing the armature 10 to rotate in a counterclockwise direction. This causes the contacts 20 and 27 to abut and the contacts 14 and 23 to abut thereby providing a conductive path therethrough and including the conductive strip 17.

With a ferrite material used as the armature 10, the armature 10 can be pulsed with a current of sufficient amplitude to cause the relay to switch in a manner similar to the technique used in computer core memories. The armature 10 will retain its magnetic orientation until current is pulsed in the opposite direction through the winding 13. When utilizing a soft iron armature, on the other hand, the magnetic orientation of the armature 10 is maintained only while current is flowing through the winding 13.

Preferably, the control winding 13 is wound large enough to allow the necessary movement of the armature 10 thereby eliminating any moving parts other than the armature 10 itself. Alternatively, the connection to the control winding 13 from the signal source may be made through sliding contacts or by flexible leads located near the center of the armature 10 where the motion is very small.

An alternative embodiment of the invention is shown in FIG. 2 in which additional pole pieces are substituted for the stationary contact supports. The contact 33 is mounted on the chamfered surface 40 of a south pole piece 41 while the contact 34 is similarly mounted on the chamfered surface 42 of a north pole piece 43. An additional control winding 44 may also be wound around the armature 10 in order to provide for coincidence selection in a manner to be described with respect to FIG. 4.

In operation, when current passes through the control windings 13 and 44 in a direction to make the extremity 16 a north pole, not only is the armature 10 repelled by the north pole piece 25 but it is also attracted by the south pole piece 41. In a similar manner, the extremity 22 which has a south magnetic orientation is repelled by the south pole piece 31 and attracted by the north pole piece 43 to cause rapid clockwise rotation of the armature 10 until the contacts 15 and 33, 21 and 34 abut.

FIG. 3 shows another embodiment of the invention which differs from that shown in FIG. 2 in that the armature 10 slides rather than rotates. The armature 10 has a guide member 50 mounted on its underside which slides in a guide channel 51 in the base 12. The base 12 preferably provides low sliding friction as well as electrical insulation, e.g. glass. The relay shown in FIG. 3 operates magnetically in a manner similar to that described with respect to the embodiment of FIG. 2 and provides two improvements thereover. First, the pivot 11 is eliminated thereby reducing friction. Second, the contacts 14 and 20 and their conductive strip 17 can be plated on a single side of the armature 10 while the contacts 15 and 21 and their conductive strip 18 can be plated on the other side. Further, the embodiment shown in FIG. 3 is somewhat more adaptable to coincidence selection and multilayering in a manner to be described with respect to FIGS. 4 and 5.

Coincidence selection is the capability of using two sources of information to select a unique operation from a matrix of possible operations. An example of coincidence selection is shown in FIG. 4.

The sixteen functions shown in the circles in FIG. 4 each require the the activation of the two lines uniquely associated with it to operate. In the example shown, the selection of lines C and H will cause only function ⑫ to operate. Functions ④, ⑧, ⑯, ⑨, ⑩, ⑪ are only partially selected and will not operate. Functions ①, ②, ③, ⑤, ⑥, ⑦, ⑬, ⑭, and ⑮ are not selected at all and therefore cannot operate. For example, referring to FIG. 3, the line C may be connected to the control winding 13 while the line H may be connected to the control winding 44. Thus, by means of only eight control lines (A through H), any one of sixteen functions can be selected. If the controlling were accomplished by standard or linear controls, sixteen controls would be required. The savings increase rapidly with increased matrix sizes.

Coincident selection may be accomplished in this relay configuration by means of a ferrite armature. The ferrite used would leave a square hysteresis characteristic in order that selection could be similar to digital computer core memory selection. With the use of a ferrite armature, the switching or control functions may be accomplished with micro-second pulses.

Referring to FIG. 5, a plurality of relays of the type shown in FIG. 3 are disposed coplanar on a base 12. They are randomly placed to demonstrate the versatility of the relay matrix. The lower layer of relays is supported on the base 12 while another layer of relays is supported directly above on another base 12'. The bars marked with N's and S's are permanent magnets. In the drawing, the leads, contacts and windings have been omitted for purposes of clarity. It will be appreciated by viewing FIG. 5 that the leads that are normally connected to the contacts of each of the relays may be connected to another contact of a relay in the same layer or may be connected to the contact of a relay in another layer in order to provide universal interconnection. This arrangement provides a packaging density capability that is far superior to that of other known relays. For example, this permits more than fifty relays to be packaged within a cubic inch.

Referring now to FIG. 6, an alternative embodiment of a multilayer relay matrix may use ceramic magnetic blocks 60 and 61. Each of the blocks 60 and 61 have alternate north and south pole pieces 62 and 63 and 62' and 63', respectively, extending, extending vertically and projecting outwardly as viewed in the drawing. With block 60 mounted opposite block 61, the positionable armatures 10 are disposed to have their respective extremities extend between north and south pole pieces 62, 63 and 62', 63', respectively. A vertical rod 66 extending through a plurality of the vertically disposed armatures 10 permits the armatures 10 to be stacked vertically and pivot around a common axis defined by the rod 66. A thin horizontal sheet 67 of insulating material between each layer provides electrical insulation between the stacked relays. The sheets 67 may have circuitry printed thereon for connection to the windings on the respective armatures. The leads, windings and contacts are not shown for purposes of clarity. The sheets 67 also provide mechanical support for the rods 66.

By utilizing square loop hysteresis ferrites for the armatures 10 and multiple armature windings as shown in FIG. 3, a matrix type selection can be provided to switch any one or any group of armatures 10 in accordance with a control signal pulse.

In view of the explanation provided above regarding the present invention, it will be appreciated that the present invention combines at least six important advantages, the combination of which is not found in any other circuit controlling device. These advantages are: (1) coincidence selection capability, (2) self latching with no holding power required, (3) contact bounce substantially eliminated since no restoring springs are required, (4) identical pull-in and drop-out operation, (5) extremely high speed, and (6) high packaging density.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A circuit controlling device comprising
  (1) first, second, third and fourth bar magnets having first, second, third and fourth north and south polar extremities respectively disposed substantially in a single predetermined plane,
  (2) said first and second bar magnets being spaced to form a first air gap therebetween, (3) said third and fourth bar magnets being spaced to form a second air gap therebetween,
(4) said air gaps being defined by polar extremities of opposite magnetic orientation,
(5) first, second, third and fourth contacts mounted on respective extremities of said first, second, third and fourth bar magnets within said air gaps,
(6) a positionable magnetizable armature having first and second extremities disposed in said plane and within said first and second air gaps respectively and adapted to be magnetically oriented oppositely with respect to each other,
(7) fifth, sixth, seventh and eighth contacts mounted on said armature for cooperation with said first, second, third and fourth contacts respectively,
(8) and at least one magnetizing coil wound on said magnetizable armature for magnetically orienting said armature whereby with said armature having said first magnetic orientation said armature is attracted towards said first and third polar extremities and repelled by said second and fourth polar extremities and with said armature having said second magnetic orientation the magnetic attraction and repulsion is reversed.

2. A device of the character described in claim 1 in which said magnetic pole pieces and said armature are coplanar and said armature has mounted thereon conducting paths between said fifth and sixth contact means in order to provide a conducting path through selected first, second, third and fourth contacts depending upon said magnetic orientation.

3. A device of the character described in claim 1 in which said armature is slidably mounted.

4. A device of the character described in claim 1 in which said armature is a ferrite material and further including at least two magnetizing coils on said armature energizable from separate signal sources, the signals from which must be synchronized in order to position said armature.

5. A matrix of circuit controlling devices comprising
(1) first and second pole piece support means spaced with respect to each other and each having a plurality of alternately disposed projecting north and south pole pieces,
(2) said pole pieces being spaced to form air gaps between respective pole pieces of opposite magnetic orientation,
(3) contacts mounted on respective pole pieces within said air gaps,
(4) a plurality of layers of positionable magnetizable armatures having first extremities disposed within respective air gaps of said first means and second extremities disposed within respective air gaps of said second means,
(5) said first and second extremities being adapted to be magnetically oriented oppositely with respect to each other,
(6) contacts mounted on said first and second extremities of each of said armatures and cooperative with the respective contacts mounted on said pole pieces,
(7) and magnetizing means wounded on respective armatures for magnetically orienting each of said armatures.

References Cited in the file of this patent

UNITED STATES PATENTS

| | | |
|---|---|---|
| 367,332 | Baxter | July 26, 1887 |
| 1,547,964 | Semat | July 28, 1925 |
| 1,552,676 | Carpenter et al. | Sept. 8, 1925 |
| 2,671,863 | Matthews | Mar. 9, 1954 |
| 2,872,546 | Babcock | Feb. 3, 1959 |

FOREIGN PATENTS

| | | |
|---|---|---|
| 523,157 | Italy | Apr. 14, 1955 |
| 895,798 | France | Apr. 11, 1944 |